United States Patent

Blum et al.

[11] Patent Number: 5,349,041
[45] Date of Patent: Sep. 20, 1994

[54] WATER DILUTABLE, POLYESTER POLYOLS AND THEIR USE IN COATING COMPOSITIONS

[75] Inventors: Harald Blum, Wachtendonk; Lothar Kahl, Bergisch Gladbach; Nusret Yuva, Leichlingen; Manfred Bock, Leverkusen, all of Fed. Rep. of Germany

[73] Assignee: Bayer Aktiengesellschaft, Leverkusen, Fed. Rep. of Germany

[21] Appl. No.: 61,640

[22] Filed: May 12, 1993

[30] Foreign Application Priority Data

May 19, 1992 [DE] Fed. Rep. of Germany ....... 4216536

[51] Int. Cl.$^5$ ................. C08G 18/32; C08G 18/38; C08G 18/40
[52] U.S. Cl. ........................... 528/85; 528/44; 528/68; 528/80; 528/84; 528/904; 525/440
[58] Field of Search ................. 525/440; 528/638, 44, 528/80, 84, 85

[56] References Cited

U.S. PATENT DOCUMENTS

| | | | |
|---|---|---|---|
| 5,096,992 | 5/1992 | Ross et al. | 528/59 |
| 5,126,393 | 6/1992 | Blum et al. | 524/538 |
| 5,141,987 | 8/1992 | Nachtkamp et al. | 524/591 |
| 5,177,141 | 1/1993 | Thoma et al. | 524/591 |

FOREIGN PATENT DOCUMENTS 455028 11/1991 European Pat. Off. .
1022790 1/1958 Fed. Rep. of Germany .

Primary Examiner—James J. Seidleck
Assistant Examiner—Mary Critharis
Attorney, Agent, or Firm—Joseph C. Gil; Thomas W. Roy; Richard E. L. Henderson

[57] ABSTRACT

The present invention relates to water dilutable, urethane group-containing polyester polyols having an acid number of 6 to 45 mg KOH/g, wherein 25 to 100% of the acid groups are neutralized by bases, a hydroxyl number of 20 to 250 mg KOH/g, a molecular weight ($M_w$) of 2,000 to 150,000 and a urethane content (—NH—CO—O—) of 2 to 16% by weight, wherein the polyester polyol is the at least partly neutralized reaction product of a) 35 to 90% by weight of branched polyester polyols having a hydroxyl number of 40 to 600 and prepared from
  a1) 0 to 60% by weight of monocarboxylic acids,
  a2) 6 to 65% by weight of di- and/or tricarboxylic acids or their anhydrides,
  a3) 10 to 70% by weight of alcohols,
  a4) 0 to 35% by weight of monoalcohols,
  a5) 0 to 30% by weight of hydroxycarboxylic acids, aminocarboxylic acids, lactones, lactams and aminoalcohols and
  a6) 0 to 45% by weight of polycarbonate polyols,
b) 0.5 to 8.5% by weight of hydroxycarboxylic acids
c) 0 to 15% by weight of compounds containing OH, NH and/or NH$_2$ groups and having a molecular weight of 32 to 500,
d) 3 to 33% by weight of compounds containing isocyanate groups and having a molecular weight of 168 to 2,000 and
e) 0 to 45% by weight of polycarbonate polyols, wherein the percentages of a) to e) and a1) to a6) add up to 100% and wherein the urethane group-containing polyester polyols contain 1 to 25% by weight of carbonate groups (—O—CO—O—) incorporated through components e) and/or a6).

8 Claims, No Drawings

WATER DILUTABLE, POLYESTER POLYOLS AND THEIR USE IN COATING COMPOSITIONS

BACKGROUND OF THE INVENTION

1. Field of the Invention

The present invention relates to water dilutable, polyester polyols which contain urethane and carbonate groups; water dilutable binders based on these polyester polyols; and the use of the polyester polyols as a binder component in aqueous coating and jointing compositions.

2. Description of the Prior Art

In many applications modern aqueous binders are replacing solvent-based binders. This applies in particular to those areas in which aqueous binders have specific advantages, such as in electrophoretic enamelling.

For applications with high property requirements, such as clear automobile lacquers, aqueous binders which satisfy these demands have not previously been available. In EP-A 0,455,028, for example, emulsion copolymers are described which produce automobile clear lacquers in combination with melamine resins. These resins already possess reasonable properties, but are deficient with regard to optical properties, such as sheen, and flowability.

In addition to very good optical properties, automobile clear lacquers must also possess excellent resistance to chemicals and solvents or petrol. In this respect, it should be ensured that the coatings retain their properties for as long as possible even when there is progressive pollution of the environment. In addition, aqueous binders should contain as little organic solvent as possible in order to satisfy strict standards with reference to environmental acceptability.

It is an object of the present invention to provide aqueous binders which are suitable for applications with high property requirements, such as clear automobile coatings, which require in very good optical properties and excellent resistance to chemicals and solvents, which can also be prepared economically and which contain little volatile organic solvent.

These objects may be achieved with the water dilutable, polyester polyols according to the invention which contain urethane and carbonate segments and which are described in more detail hereinafter. The polyester polyols according to the invention are extremely compatible with water and also with other known lacquer components, contain few volatile organic substances and may be processed in combination with the known cross-linking resins to give high-quality, storage-stable, aqueous coating and jointing compositions.

SUMMARY OF THE INVENTION

The present invention relates to water dilutable, urethane group-containing polyester polyols having an acid number of 6 to 45 mg KOH/g, wherein 25 to 100% of the acid groups are neutralized by bases, a hydroxyl number of 20 to 250 mg KOH/g, a molecular weight ($M_w$) of 2,000 to 150,000 and a urethane content (—NH—CO—O—) of 2 to 16% by weight, wherein the polyester polyol is the at least partly neutralized reaction product of a) 35 to 90% by weight of one or more branched polyester polyols which have a hydroxyl number of 40 to 600 and are the reaction product of a1) 0 to 60% by weight of one or more monocarboxylic acids having 6 to 22 carbon atoms, a2) 6 to 65% by weight of one or more di- and/or tricarboxylic acids or their anhydrides, a3) 10 to 70% by weight of one or more alcohols having two and/or more hydroxyl groups, a4) 0 to 35% by weight of one or more monoalcohols, a5) 0 to 30% by weight of one or more hydroxycarboxylic acids, aminocarboxylic acids, lactones, lactams and aminoalcohols and a6) 0 to 45% by weight of one or more polycarbonate polyols having a molecular weight of 450 to 16,000, b) 0.5 to 8.5% by weight of one or more hydroxycarboxylic acids c) 0 to 15% by weight of one or more compounds containing at least one OH, NH and/or $NH_2$ group and having a molecular weight of 32 to 500, d) 3 to 33% by weight of one or more compounds containing at least two isocyanate groups and having a molecular weight of 168 to 2,000 and e) 0 to 45% by weight of a polycarbonate polyol having a molecular weight of 450 to 16,000, wherein the percentages of a) to e) and a1) to a6) add up to 100% and wherein the urethane group-containing polyester polyols contain 1 to 25% by weight of carbonate groups (—O—CO—O—) incorporated through components e) and/or a6).

The present invention also relates to water dilutable binders which contain

A) 30 to 98% by weight of the polyester polyols according to the invention and

B) 2 to 70% by weight of one or more cross-linking agents, wherein the percentages are based on the solids content of A) and B).

Finally, the present invention relates to coating or jointing compositions containing the polyester polyols according to the invention, optionally in combination with other resins having hydroxyl groups, as a binder component.

DETAILED DESCRIPTION OF THE INVENTION

The polyester polyols according to the invention, are polymers which contain alcoholic hydroxyl groups, ester groups, carbonate groups, urethane groups, salt groups and optionally free acid groups. The molecular weight ($M_w$, determined by gel permeation chromatography using calibrated polystyrene as a standard) is 2,000 to 150,000, preferably 3,500 to 70,000. The content of ester groups (i.e., carboxylic ester groups), —CO—O—, is 3.5 to 45, preferably 7.5 to 35% by weight; the content of urethane groups, —NH—CO—O—, is 2 to 16, preferably 3.5 to 13.5% by weight; and the content of carbonate groups, —O—CO—O—, is 1 to 25, preferably 2.0 to 16.0% by weight. The acid number of the polyester polyols, which is based on both free acid groups and acid groups neutralized by bases (sulphonic acid groups and preferably carboxylic acid groups) is 6 to 45, preferably 9 to 35 mg KOH/g, and the hydroxyl number is 20 to 250, preferably 35 to 220 mg KOH/g.

25 to 100% of the acid groups incorporated into the polyester polyols according to the invention are neutralized by bases. These salt groups (preferably carboxylate groups) provide water dilutability or water dispersibility to the polyester polyols according to the invention.

The polyester polyols according to the invention are generally used in the form of aqueous dispersions having a solids content of 15 to 65, preferably 25 to 55% by weight; a viscosity of 10 to 25,000, preferably 50 to 8,000 mPa.s; and a pH of 5 to 10, preferably 6.5 to 9.5, at 23° C. The term "dispersion" is intended to include both genuine aqueous dispersions and aqueous solutions. Whether the polyester polyols are present as dispersions or solutions depends in particular upon the content of salt groups and the molecular weight of the polyester polyols.

Preferably, the urethane-groups containing polyester polyols according to the invention are prepared and converted into an aqueous dispersion by reacting a) 35 to 90, preferably 41 to 86% by weight of one or more branched polyester polyols having a hydroxyl number of 40 to 600, preferably 50 to 450 mg KOH/g, b) 0.5 to 8.5, preferably 1.5 to 7.0% by weight of one or more hydroxycarboxylic acids, preferably 2,2-bis(hydroxymethyl)-alkanoic acid, c) 0 to 15, preferably 0 to 10% by weight of one or more compounds having a molecular weight of 32 to 500 and containing one or more, preferably 1 to 4, OH, NH or $NH_2$ groups, preferably OH groups, d) 3 to 33, preferably 5 to 26% by weight of one or more compounds having at least two isocyanate groups and having a molecular weight of 168 to 2,000 and e) 0 to 45, preferably 5 to 40% by weight of a polycarbonate polyol having a molecular weight of 450 to 16,000, wherein the percentages of a) to e) add up to 100%. The polyester is present as 40 to 100% solids organic solution and is prepared by initially introducing components a), b), c), e), optionally dissolved in an organic solvent, and reacting these components with component d) in the presence of 0 to 2.5, preferably 0.01 to 0.5% by weight of a suitable catalyst at 40° to 140° C. When virtually no free NCO groups are detectable, the reaction mixture is dispersed or dissolved in water. 25 to 100, preferably 45 to 100%, of the acid groups introduced into the reaction product are converted into salt groups by the addition of a neutralizing agent during the reaction or before or during the dispersion step.

Structural component a) is selected from branched polyester polyols which satisfy the requirements previously set forth. The term "branched" means that the polyester polyols contain an average of 0.7, preferably at least one, branch points per molecule.

Preparation of the branched polyester polyols a) takes place by the polycondensation of a1) 0 to 60, preferably 0 to 55% by weight of one or more monocarboxylic acids with 6 to 22, preferably 7 to 18, carbon atoms, a2) 6 to 65, preferably 11 to 58% by weight of one or more di- and/or tricarboxylic acids or their anhydrides, a3) 10 to 70, preferably 17 to 63% by weight of one or more alcohols which contain two and/or more hydroxyl groups, a4) 0 to 35, preferably 0 to 15% by weight of one or more monoalcohols, a5) 0 to 30, preferably 0 to 20% by weight of one or more hydroxycarboxylic acids, aminocarboxylic acids, lactones, lactams or aminoalcohols and a6) 0 to 45, preferably 5 to 40% by weight of one or more polycarbonate polyols having a molecular weight of 450 to 16,000, preferably 750 to 6,000, wherein the percentages of a1) to a6) add up to 100%. The branched polyester polyols are prepare, optionally in the presence of known esterification catalysts, preferably by a melt or azeotropic condensation reaction at temperatures of 140° to 240° C. Structural components, preferably components a2) and/or a3), having three or more functional groups must be used in amounts which provide the required degree of branching. In general, the proportion of structural components, preferably a2) and/or a3), having three or more functional groups is at least 8, preferably at least 13% by weight, based on the total weight of starting components a1) to a6).

Starting component a1) is selected from monocarboxylic acids which having a molecular weight of 112 to 340. Suitable monocarboxylic acids include benzoic acid, tert.-butylbenzoic acid, cyclohexanoic acid, saturated fatty acids (such as 2-ethylhexanoic acid, isononanoic acid, coconut oil fatty acid, hydrogenated industrial fatty acids or fatty acid mixtures), decanoic acid, dodecanoic acid, tetradecanoic acid, stearic acid, palmitic acid, docosanoic acid and unsaturated fatty acids (such as soybean oil fatty acid, ricinoleic acid, sorbic acid, arachidic acid, konjuen fatty acid, rosin fatty acid and safflower oil fatty acid) and mixtures of these or other monocarboxylic acids.

Starting component a2) is selected from di- and/or tricarboxylic acids or their anhydrides having a molecular weight of 98 to 600. Examples include phthalic acid or its anhydride, isophthalic acid, terephthalic acid, tetrahydrophthalic acid or its anhydride, hexahydrophthalic acid or its anhydride, maleic acid or its anhydride, succinic acid or its anhydride, fumaric acid, adipic acid, sebacic acid, azelaic acid, dimeric fatty acids, trimeric fatty acids, trimellitic acid or its anhydride and mixtures of these or other acids.

Starting component a3) is selected from diols, triols, tetrols and higher functional alcohols having a molecular weight of 62 to 400. Examples include ethylene glycol, 1,2- and 1,3-propylene glycol, 1,3-, 1,4- and 2,3-butanediol, 1,6-hexanediol, 2,5-hexanediol, trimethylhexanediol, diethylene glycol, triethylene glycol, hydrogenated bisphenols, 1,4-cyclohexanediol, 1,4-cyclohexane-dimethanol, neopentyl glycol, tricyclodecanediol, 1,4-butenediol, trimethylolpropane, glycerol, pentaerythritol, trimethylpentanediol, dipentaerythritol, ditrimethylolpropane and mixtures of these or other alcohols.

Starting component a4) is selected from monoalcohols having a molecular weight from 100 to 290. Examples include n-hexanol, cyclohexanol, decanol, dodecanol, tetradecanol, octanol, octadecanol, natural fatty alcohol mixtures such as Ocenol 110/130 (Henkel) and mixtures of these and other alcohols.

Starting component a5) is selected from compounds which are at least difunctional in a polyaddition or polycondensation reaction to form ester and/or amide groups and have a molecular weight of 61 to 350. Examples include hydroxycarboxylic acids, lactones, aminoalcohols and aminocarboxylic acids, e.g., dimethylolpropionic acid, lactic acid, malic acid, tartaric acid, $\epsilon$-caprolactone, aminoethanol, aminopropanol, diethanolamine, aminoacetic acid, aminohexanoic acid and $\epsilon$-caprolactam.

Starting component a6) is selected from polycarbonates which contain at least one, preferably two hydroxyl groups. Such polycarbonates may be obtained by reacting carbonic acid derivatives (such as diphenyl carbonate or phosgene) with alcohols, preferably diols.

Suitable diols include ethylene glycol, propanediol, butanediol, hexanediol, neopentyl glycol, di-, tri- or tetraethylene glycol, dipropylene glycol, 1,4-cyclohexane-dimethanol and bisphenol A. Also suitable are mixtures of these and other diols which may be in admixture with monoalcohols such as ethanol, butanol, hexanol, stearyl alcohol; fatty alcohols (e.g., Ocenol 110/130, Henkel); tri-and tetraalcohols such as glycerol, trimethylolpropane and pentaerythritol; and higher functional alcohols such as sorbitol. Also suitable for the preparation of polycarbonates are reaction products of the alcohols previously mentioned with ethylene oxide, propylene oxide or ε-caprolactone. The molecular weight of the polycarbonates is 450 to 6,000, preferably 750 to 4,000.

Preferred polyester polyols a) contain a1) 0 to 55% by weight of one or more monocarboxylic acids having 7 to 18 carbon atoms such as benzoic acid, 2-ethylhexanoic acid, isononanoic acid, hydrogenated industrial fatty acids or their mixtures (such as Prifrac 2950, Prifrac 2960, Prifrac 2980 from Unichema International), stearic acid, palmitic acid, arichidic acid, soybean fatty acid, sunflower seed fatty acid, oleic acid and linseed oil fatty acid;

a2) 11 to 58% by weight of one or more di- and/or tricarboxylic acids or their anhydrides such as phthalic anhydride, hexahydrophthalic anhydride, isophthalic acid, maleic anhydride, terephthalic acid, fumaric acid, adipic acid, benzenetricarboxylic acid and dimeric fatty acids;

a3) 17 to 63% by weight of one or more alcohols having two and/or more hydroxyl groups, such as ethylene glycol, 1,2-propylene glycol, 1,6-hexanediol, 1,4-cyclohexane-dimethanol, neopentyl glycol, trimethylolpropane, glycerol and pentaerythritol, and a6) 0 to 45% by weight of one or more hydroxyl group-containing polyycarbonates prepared from carbonic acid derivatives and diols having a molecular weight of 750 to 6,000.

In the event of azeotropic esterification, the entraining agent (such as isooctane, xylene, toluene or cyclohexane) is distilled off under vacuum after the reaction is complete.

Component b) is selected from one or more hydroxycarboxylic acids, preferably 2,2-bis-(hydroxymethyl-)alkanoic acids, having a total of at least 5 carbon atoms such as 2,2-bis-(hydroxymethyl)-propionic acid (dimethylolpropionic acid).

Component c) is selected from compounds having a molecular weight of 32 to 5000 and containing at least one, preferably 1 to 4, OH, NH and/or $NH_2$ groups, preferably OH groups. Examples include ethanol, methoxypropanol, butyl glycol, cyclohexanol, ethylene glycol, 1,6-hexanediol, neopentyl glycol, 1,4-cyclohexane-dimethanol, trimethylolpropane, glycerol and pentaerythritol. Also suitable, but less preferred, are aminoethanol, aminoisopropanol, diethanolamine, diisopropanolamine, stearylamine and N,N'-dimethyl-1,3-aminopropane. Also suitable are any mixtures of these compounds.

Component d) is selected from one or more organic polyisocyanates having a molecular weight of 168 to 2,000. Examples include hexamethylene diisocyanate, perhydro-2,4- and 4,4'-diphenylmethane diisocyanate, isophorone diisocyanate, toluylene diisocyanate, naphthalene diisocyanate and other isocyanates, such as those described, e.g., in "Methoden der organischen Chemie" (Houben-Weyl, vol. 14/2, 4th edition, published by Georg Thieme, Stuttgart 1963, pp. 61 to 70).

Also suitable are modified polyisocyanates prepared from hexamethylene diisocyanate, isophorone diisocyanate, diphenylmethane diisocyanate and toluylene diisocyanate, which have been modified to contain urethane groups, uretdione groups, isocyanurate groups and/or biuret groups.

Preferably, hexamethylene diisocyanate, isophorone diisocyanate, perhydro-2,4'- and 4,4'-diphenylmethane diisocyanate and modified polyisocyanates based on hexamethylene diisocyanate and/or isophorone diisocyanate are used. Also suitable are any mixtures of polyisocyanates.

Component e) is selected from polycarbonate polyols which meet the previously described requirements. Preferably, the amount of component e) is smaller than the amount of component a) and, in addition, the amount of component a6) is smaller than the sum of components a1) to a5). However, the total amount of starting components a6) and e) must be sufficient to provide the required carbonate content for the polyester polyols according to the invention.

Suitable solvents for preparing the polyester-/polyurethane/polycarbonate resins include N-methyl-pyrrolidone, diethylene glycol dimethyl ether, methylethyl ketone, methylisobutyl ketone, acetone, xylene, toluene, butyl acetate and mixtures of these or other solvents. The organic solvent may be partially or completely removed from the reaction mixture before, during or after the dispersion step, optionally azeotropically and/or by the application of a vacuum or a reinforced stream of inert gas.

Suitable catalysts for the urethanization reaction include triethylamine, tin(II) octoate, dibutyltin oxide, dibutyltin dilaurate and other known catalysts.

Before or during the dispersion step, 25 to 100, preferably 45 to 100% of the acid groups which are incorporated are converted into salt groups by the addition of at least one base. Frequently, an excess of base may be expedient in order to improve certain properties of the polyester polyols dispersed in water, for example, compatibility with pigments.

Suitable bases include ammonia, N-methylmorpholine, triethylamine, dimethylethanolamine, methyldiethanolamine, triethanolamine, morpholine, tripropylamine, ethanolamine, triisopropanolamine, 2-amino-2-methyl-1-propanol and mixtures of these and other neutralizing agents. Also suitable, though less preferred are sodium hydroxide, lithium hydroxide and potassium hydroxide. Preferred neutralizing agents are ammonia, dimethylethanolamine and methyldiethanolamine.

After the urethanization reaction, small amounts of other organic solvents (such as ethanol, propanol, butanol, butyl glycol, hexanol, octanol, butyl diglycol, ethyl diglycol, methyl diglycol and methoxypropanol) may also be added to provide certain properties.

During the dispersion step, the water/neutralizing agent mixture may be added to the resin; the water may be added to the resin/neutralizing agent mixture; the resin may be added to the water/neutralizing agent mixture; or the resin/neutralizing agent mixture may be added to water. The dispersibility of the resins in water may be improved, if desired, by the addition of external emulsifiers, such as ethoxylated nonylphenol, during dispersion.

The dispersion step is usually performed at 40° to 100° C. The aqueous dispersions of polyester polyols according to the invention generally possess the solids contents already mentioned above. The proportion of organic solvent is generally less than 10, preferably less than 6 and more preferably less than 4% by weight.

The binders according to the invention are combinations of polyester polyols A) and cross-linking agents B) in the amounts previously set forth. These binders are suitable for use as coating or jointing compositions.

Suitable cross-linking agents B) are aminoplast resins, polyisocyanates having blocked or free isocyanate groups and mixtures of these cross-linking agents.

Suitable aminoplast resins include water dilutable or water dispersible, melamine/formaldehyde or urea/formaldehyde condensation products, such as those described by D. H. Solomon in The Chemistry of Organic Filmformers, p. 235 et seq., John Wiley & Sons, Inc., New York, 1967. The melamine resins may be replaced, completely or partly, by other cross-linking amino plastics, such as those described in "Methoden der organischen Chemie" (Houben-Weyl), vol. 14/2, part 2, 4th edition, published by Georg Thieme, Stuttgart, 1963, p. 319 et seq.

Other suitable cross-linking agents include are blocked polyisocyanates prepared by blocking isophorone diisocyanate, hexamethylene diisocyanate, 1,4-diisocyanatocyclohexane, bis-(4-isocyanatocyclohexyl)-methane, 1,3-diisocyanatobenzene, 1,4-diisocyanatobenzene, 2,4 -diisocyanato-1-methylbenzene, 1,3-diisocyanato-2-methylbenzene, 1,3-bis-isocyanatomethylbenzene, 2,4-bis-isocyanatomethyl-1,5-dimethylbenzene, bis-(4-isocyanatophenyl)-propane, tris-(4-isocyanatophenyl)-methane and trimethyl-1,6-diisocyanatohexane. Also suitable are blocked modified polyisocyanates such as polyisocyanates containing biuret groups and prepared from 1,6-diisocyanatohexane, polyisocyanates containing isocyanurate groups and prepared from 1,6-diisocyanatohexane, polyisocyanates containing urethane groups and prepared from 2,4- and/or 2,6-diisocyanatotoluene or isophorone diisocyanate low molecular weight polyhydroxyl compounds such as trimethylolpropane, the isomeric propanediols or butanediols and mixtures of these and other polyhydroxyl compounds.

Also suitable are blocked polyisocyanates which have been rendered hydrophilic by the incorporation of salt groups or polyether units.

Suitable blocking agents for these polyisocyanates include monoalcohols such as methanol, ethanol, butanol, hexanol and benzyl alcohol; oximes such as acetoxime and methylethyl ketoxime; lactams such as $\epsilon$-caprolactam; phenols and CH-acidic compounds such as diethylmalonate.

Suitable polyisocyanate cross-linking agents B) containing free isocyanate groups include organic polyisocyanates having aliphatically, cycloaliphatically, araliphatically and/or aromatically bound isocyanate groups, which are liquid at room temperature or may be converted to liquids by the addition of solvent. Such polyisocyanate cross-linking agents B) generally have a viscosity of 50 to 10,000, preferably 50 to 1,500 mPa.s. Particularly preferred for use as polyisocyanate component B) are polyisocyanates or polyisocyanate mixtures having exclusively aliphatically and/or cycloaliphatically bound isocyanate groups, an average NCO functionality of 2.2 to 5.0, and a viscosity of 50 to 1,500 mPa.s at 23° C.

If required, the polyisocyanates may be used mixed with small amounts of inert solvents in order to lower the viscosity to a value within these disclosed ranges.

Extremely suitable unblocked polyisocyanates include modified polyisocyanates prepared from hexamethylene diisocyanate, 1-isocyanato-3,3,5-trimethyl-5-isocyanatomethylcyclohexane (IPDI) and/or bis-(isocyanato-cyclohexyl)-methane. "Modified polyisocyanates" are defined as derivatives of diisocyanates which contain biuret, urethane, uretdione and/or isocyanurate groups and which, following their preparation, have been freed from excess initial diisocyanate down to a residual content of less than 0.5% by weight in known manner, preferably by distillation.

Preferred aliphatic polyisocyanates include polyisocyanates which contain biuret groups, are prepared from hexamethylene diisocyanate as described, for example, in U.S. Pat. Nos. 3,124,605, 3,358,010, 3,903,126, 3,903,127 or 3,976,622 and which are made up of mixtures of N,N',N"-tris-(6-isocyanatohexyl)-biuret with smaller amounts of its higher homologues; and polyisocyanates which contain isocyanurate groups, are prepared from hexamethylene diisocyanate as described, for example, in U.S Pat. No. 4,324,879, and which are made up of mixtures of N,N',N"-tris-(6-isocyanatohexyl)-isocyanurate with smaller amounts of its higher homologues.

Also suitable, though less preferred, are aromatic polyisocyanates, in particular, modified polyisocyanates prepared from 2,4-diisocyanatotoluene or commercial mixtures thereof with 2,6-diisocyanatotoluene or prepared from 4,4"-diisocyanato-diphenylmethane or mixtures thereof with its isomers and/or higher homologues.

Other suitable unblocked polyisocyanate cross-linking agents are those which have been rendered hydrophilic by the incorporation of salt groups and/or polyether units.

Binders containing melamine resins or blocked polyisocyanates as cross-linking agents are examples of heat-crosslinkable single component systems which are capable of being stored at room temperature. Corresponding systems which contain polyisocyanates having free isocyanate groups represent two-component systems which may be obtained by mixing the individual components and which only have a limited pot life at room temperature.

To prepare the binders according to the invention in a water dispersed form, the aqueous dispersions of the polyester polyols A) are mixed with the cross-linking agent B) which may optionally be dissolved in an inert solvent or dissolved or dispersed in water. The polyester polyols A) may take on the function of an emulsifier for cross-linking agents B) if the latter are not water-dispersible on their own. This function may also be supported by the use of external emulsifiers.

Before the addition of cross-linking component B), the known auxiliaries and additives for paints may be incorporated into component A). These include anti-foaming agents, thickeners, flow controllers, pigments, dispersion agents for distributing pigments and the like.

The preparation of coating compositions, which contain the aqueous binders according to the invention as the binding agent, preferably takes place in a multi-stage process. In the first step a urethane group-containing polyester polyol is prepared by reacting starting materials a) to e) at 40° to 140° C, optionally in the presence of up to 60% by weight, based on the total weight of reaction mixture, of inert solvents. In the second step the resins obtained in the first step are dissolved or dispersed in water and 25 to 100% of the acid groups are converted into salt groups with a neutralizing agent before and/or during this step. In the third step, the cross-linking component is dispersed or dissolved in the aqueous dispersion of the polyester polyol, optionally after the addition of auxiliaries and additives.

In the coating and jointing compositions according to the invention, the polyester polyols are present as the essential binder component. However, in addition to polyester polyols A) and cross-linking agents B), other lacquer resins C) may also be present in an amount, based on solids content of component A), of up to 500, preferably up to 250% by weight.

Examples of lacquer resins C) containing hydroxyl groups include known, water dilutable, non-ionic or anionic binders based on polyepoxides, polyesters, polyurethanes, polyethers, polyamines, polyolefins, polydienes and/or polyacrylates. The compatibility of these resins may be determined using a preliminary test.

Included among the preferred areas of application for the polyester polyols according to the invention are their use as a binder component in clear finishing paints, such as those used for coating automobiles, which are preferably hardened at elevated temperatures. The urethane group-containing polyester polyols are also suitable as a binder component for aqueous coating compositions to be applied to plastic, film, metal or wood, as well as a binder component for primers for mineral substrates. Also, the preparation of solids-rich, one-layer finishing paints is possible using the polyester polyols according to the invention as a binder component. The polyester polyols or the binders according to the invention are also suitable for preparing jointing compositions containing small amounts of solvent as well as for preparing adhesives.

The invention is further illustrated but is not intended to be limited by the following examples in which all parts and percentages are by weight unless otherwise specified.

EXAMPLES

Example 1

2,362 g (17.8% by wt.) of trimethylolpropane,
5,067 g (38.1% by wt.) of hexahydrophthalic anhydride,
2,322 g (17.5% by wt.) of neopentyl glycol,
1,152 g (8.7% by wt.) of maleic anhydride,
1,387 g (10.4% by wt.) of hexanediol-1,6 and
1,015 g (7.5% by wt.) of 1,4-cyclohexanedimethanol
were esterified at 220° C. until the OH number was 195 in a 15 l reaction vessel equipped with stirring, cooling and heating devices and a water separator.

580 g of this polyester, 250 g of a linear poly-1,6-hexanediol carbonate having terminal hydroxyl groups and an OH number of 56, 40 g of dimethylolpropionic acid and 0.7 g dibutyltin dilaurate were dissolved in 75 g of N-methylpyrrolidone (NMP) at 80° C. and then reacted with 130 g of isophorone diisocyanate at 130° C. utilizing the heat produced from the exothermic reaction. When NCO groups were no longer detectable, 11.4 g of dimethylethanolamine and 1,090 g of water were added at 80° C. A aqueous, homogeneous and stable polyester polyol dispersion 1) was obtained having a solids content of about 46% and an organic solvent content of about 3.5%.

Properties of the dispersed polyester polyol:

The acid and OH numbers are experimental values which have been rounded off, while the urethane or carbonate group contents are calculated values which have been rounded off.
Acid number (mg KOH/g): 20
OH number (mg KOH/g): 100
Percentage of urethane groups (—NHCOO—): 7
Percentage of carbonate groups (—OCOO—): 10

Example 2

2,330 g (17.3% by wt.) of trimethylolpropane,
4,165 g (31.0% by wt.) of hexahydrophthalic anhydride,
1,909 g (14.2% by wt.) of neopentyl glycol,
1,410 g (10.5% by wt.) of adipic acid,
1,140 g (8.5% by wt.) of hexanediol-1,6,
834 g (6.2% by wt.) of 1,4-cyclohexanedimethanol and
1,652 g (12.3% by wt.) of a saturated monocarboxylic acid (Prifrac 2980, Unichema)
were esterified at 220° C. until the acid number was ≦3 and the OH number was 180 in a 15 l reaction vessel equipped with stirring, cooling and heating devices and a water separator.

610 g of this polyester, 200 g of the polycarbonate diol described in Example 1, 40 g of dimethylolpropionic acid and 1 g of dibutyltin oxide were dissolved in 75.3 g of NMP and reacted with 150 g of isophorone diisocyanate at 80° C. The reaction was performed at 130° C. until NCO groups were no longer detectable. After cooling to 100° C., 21.0 g of dimethylethanolamine and 1,120 g of water were added. A homogeneous, stable, aqueous polyester polyol dispersion 2) was obtained as an about 45% solids solution having an organic solvent content of about 3.4%.

Properties of the dispersed polyester polyol:
Acid number (mg KOH/g): 19
OH number (mg KOH/g): 79
Percentage of urethane groups (—NHCOO—): 8
Percentage of carbonate groups (—OCOO—): 8

Example 3

2,297 g (17.0% by wt.) of trimethylolpropane,
4,928 g (36.6% by wt.) of hexahydrophthalic anhydride,
2,258 g (16.7% by wt.) of neopentyl glycol,
1,668 g (12.4% by wt.) of adipic acid,
1,349 g (10.0% by wt.) of hexanediol-1,6, and
987 g (7.3% by wt.) of 1,4-cyclohexanedimethanol were weighed into a 15 l reaction vessel equipped with stirring, cooling and heating devices and a water separator and esterified at 220° C. until the acid number was reduced to 3. The polyester then had an OH number of about 203.

610 g of this polyester, 200 g of the polycarbonate diol described in Example 1, 40 g of dimethylolpropionic acid and 1.3 g of dibutyltin oxide were dissolved in 75 g of NMP at 80° C. and then reacted with 150 g of isophorone diisocyanate until free NCO groups were no longer detectable. After the addition of 20.6 g of dimethylethanolamine, the polymer was dispersed in 1,175 g of water. A homogeneous, stable polyester polyol dispersion 3) was obtained having a solids content of about 44% and about 3.3% of organic solvents.

Properties of the dispersed polyester polyol:
Acid number (mg KOH/g): 19
OH number (mg KOH/g): 90
Percentage of urethane groups (—NHCOO—): 8
Percentage of carbonate groups (—OCOO—): 8

Example 4

The polyester polyol dispersions described in Examples 1 to 3 were formulated with an amino cross-linking resin to provide a clear coating composition. The spraying viscosity was adjusted to about 20 to 25 seconds (discharge viscosity in DIN-4 cup, 23° C.) by diluting with distilled water. The coating composition was compared to an analogous coating composition, i.e., "acrylate dispersion 1" according to EP-A 0,455,028 (U.S. application, Ser. No. 07/911,425). The compositions were applied by spraying onto steel sheets coated with KTL water-filler (40 μm) and water-based lacquer (silver, 15 μm). After pre-drying for 10 minutes at 60° C. and for 5 minutes at 90° C., the clear coating composition was hardened for 20 minutes at 140° C.

The following formulations were used:

|  | Clear lacquer | | | |
|---|---|---|---|---|
|  | A) | B) | C) | D) |
| Dispersion 1) | 100 | | | |
| Dispersion 2) | | 100 | | |
| Dispersion 3) | | | 100 | |
| Comparison | | | | 100 |
| Melamine resin[1)] | 24.7 | 24.1 | 23.6 | 24.1 |
| Auxiliary wetting agent[2)] | 1 | 1 | 1 | 1 |
| Flow control agent[3)] | 1 | 1 | 1 | 1 |
| Light protecting agent[4)] | 4.2 | 4.2 | 4.2 | 4.2 |
| Thickener[5)] | | | | 2 |
| Solvent[6)] | 5.7 | 9.2 | 9.4 | 5.7 |

[1)]Melamine resin — Cymel 325 (Cyanamid Int.), 80% strength
[2)]Auxiliary wetting agent — Fluorinated surfactant FC 170 (Bayer AG) 10% concentration in water
[3)]Flow control agent — Additol XW 395 (Hoechst AG), 50% strength in butyl glycol
[4)]Light protecting agent — 2:1 blend of Tinuvin 1130 and Tinuvin 292 (Ciba-Geigy), 50% concentration in NMP
[5)]Thickener — Viscalex HV 30 (Allied Colloids GmbH) 4.17% concentration in water/DMEA
[6)]Solvent — Clear lacquers A), B), C) - NMP; Clear lacquer D) - ethyl diglycol/NMP = 1:1

The following results were obtained:

|  | Clear lacquer | | | |
|---|---|---|---|---|
|  | A) | B) | C) | D) |
| Gloss 20° C. | 87 | 81 | 85 | 75 |
| DOI (optical) | 80 | 80 | 80 | 60 |
| Flow properties | very good | very good | very good | good |
| König Pendulum hardness (DIN 53 157) | 204 | 125 | 178 | 190 |
| Erichsen indentation (DIN 53156) | 6.0 | 8.5 | 7.5 | 5.5 |
| [1)]Resistance to overstoving as in VW, VW (dE) | 0.6 | 0.6 | 0.7 | 1.7 |
| [2)]Resistance to four-star petrol (10 minutes exposure) | n.e. | n.e. | n.e. | n.e. |
| [3)]Resistance to chemicals (DB method) | | | | |
| wood rosin | >72 | 38 | 44 | 40 |
| brake fluid | 44 | 36 | 36 | 36 |
| pancreatin | 56 | 42 | 38 | 40 |
| sodium hydroxide solution (1%) | 67 | >75 | 69 | 47 |
| sulphuric acid (1%) | 43 | 44 | 44 | 36 |
| [4)]Condensed water test, 240 hours | 3* | 1 | 2* | 4 |
| [5)]Resistance to water (24 hours) | 0 | 0 | 0 | 0 |

[1)]the lower the value the better
[2)]n.e. = no effect
[3)]the figure was the temperature in °C., up to which no damage occurred
[4)]Blushing was evaluated on glass plates, 0 = best value, 5 = poorest value, * = after 1 to 2 hours the films recovered.
[5)]A cotton wool wad soaked with water was laid on the hardened film, 0 = no effect.

The coating compositions according to the invention demonstrated clear advantages over the comparison with regard to optical properties, resistance to overstoving (application safety), and chemical resistance, particularly towards dilute sulphuric acid ("acid rain").

Example 5

877 g (18.0% by wt.) of trimethylolpropane, 637 g (13.0% by wt.) of adipic acid, 942 g (19.3% by wt.) of 1,4-cyclohexanedimethanol, 907 g (18.6% by wt.) of neopentyl glycol, 641 g (13.1% by wt.) of maleic anhydride and 873 g (17.9% by wt.) of hexahydrophthalic anhydride were weighed into a 5 l reaction vessel equipped with stirring, cooling and heating devices and a water separator, heated to 220° C. under an inert atmosphere and esterified until the acid number was ≦3. The polyester then had an OH number of 195.

780 g of this polyester, 80 g of the polycarbonate diol described in Example 1, 40 g of dimethylolpropionic acid and 0.8 g of dibutyltin oxide were dissolved in 75 g of N-methylpyrrolidone and reacted at 90° C. with 100 g of isophorone diisocyanate. The exothermic reaction raised the temperature to 130° C. The reaction proceeded until no NCO groups were detectable. After the addition of 22.8 g of dimethylethanolamine, the polymer was dispersed in 1,400 g of water. A stable, homogeneous polyester polyol dispersion 5) was obtained having a solids content of about 40% and an organic solvent content of about 3%.

Properties of the dispersed polyester polyol:
Acid number (mg KOH/g): 23
OH number (mg KOH/g): 150
Percentage of urethane groups (—NHCOO—): 5
Percentage of carbonate groups (—OCOO—): 3

Polyester polyol dispersion 5) was mixed with a commercially available melamine cross-linking resin (Sacopal M 232 Krems Chemie) in a weight ratio of 75:25, based on solids, adjusted to a solids content of about 45% with water and applied to a clean steel sheet with a film spreader. The film had very good flow properties. After allowing to evaporate for 15 minutes at room temperature, the coating was fired for 30 minutes at 150° C. The clear coating obtained did not soften after 10 minutes exposure to petrol or after a rubbing test using 200 back-and-forth rubs with a wad of cotton wool soaked in MIBK. Similarly, there was no effect produced in a 24 hour water test.

Example 6

258 g (5.8% by wt.) of soybean fatty acid, 731 g (16.4% by wt.) of trimethylolpropane, 1,237 g (27.8% by wt.) of hexanediol-1,6, 307 g (6.9% by wt.) of the polycarbonate diol described in Example 1,806 g (18.1% by wt.) of adipic acid and 1,120 g (28.0% by wt.) of isophthalic acid were weighed into a 5 l reaction vessel equipped with stirring, cooling and heating devices and a water separator and esterified at 210° C. A polyester-polycarbonate having an OH number of 181 was obtained.

750 g of this polyester-polycarbonate, 57.5 g of dimethylolpropionic acid and 2.5 g of dibutyltin oxide were dissolved in 149 g of N-methylpyrrolidone and reacted with 192.5 g of isophorone diisocyanate at 80° C. The reaction was continued at 120° C. When NCO groups were no longer detectable, 21.7 g of dimethylethanolamine and 1,050 g of water were added at 80° C. A stable, homogeneous, aqueous polyester polyol dispersion 6) was obtained having a solids content of about 45% and an organic solvent content of about 6.7%.

Properties of the dispersed polyester polyol:
Acid number (mg KOH/g): 27
OH number (mg KOH/g): 80
Percentage of urethane groups (—NHCOO—): 10
Percentage of carbonate groups (—OCOO—): 9

100 g of the polyester polyol dispersion were mixed with 100 g of a 40% strength aqueous solution of a blocked polyisocyanate cross-linking agent and applied to a clean steel sheet. After stoving at 165° C., a clear, homogeneous, glossy clear coating having a very even finish was obtained. The coating was not affected by 48 hours exposure to water or 15 minutes exposure to petrol.

The blocked polyisocyanate was a commercially available, water-dispersible polyisocyanate having a percentage of cycloaliphatically bound isocyanate groups, blocked with butanone oxime, (calculated as NCO) of 4.4% (Bayhyrol VP LS 2016 E, Manufacturer: Bayer AG).

Example 7

525 g (10.7% by wt.) of trimethylolpropane, 841 g (17.1% by wt.) of hexanediol-1,6, 1,283 g (26.1% by wt.) of 1,4-cyclohexanedimethanol, 260 g (5.3% by wt.) of adipic acid, 1 184 g (24.1% by wt.) of isophthalic acid and 823 g (16.7% by wt.) of phthalic anhydride were weighed into a 5 l reaction vessel equipped with stirring, cooling and heating devices and a water separator and esterified at 220° C. until the acid number was 5.5. The polyester then had an OH number of 194.

750 g of this polyester, 100 g of the polycarbonate diol described in Example 1, 15 g of pentaerythritol, 40 g of dimethylolpropionic acid and 1.3 g of dibutyltin oxide were homogenized at 100° to 120° C. and then reacted with 95 g of hexamethylene diisocyanate at 100° C. When free NCO groups were no longer detectable, 30.7 g of N-methyldiethanaloamine were added and the mix was dispersed in 1,050 g of water. A stable, solvent-free, homogeneous polyester polyol dispersion 7) having a solids content of about 48% was obtained.

Properties of the dispersed polyester polyol:
Acid number (mg KOH/g): 20
OH number (mg KOH/g): 145
Percentage of urethane groups (—NHCOO—): 7
Percentage of carbonate groups (—OCOO—): 4

100 g of polyester polyol dispersion 7) were mixed with 100 g of the blocked polyisocyanate cross-linking agent from Example 6, treated with 2 g of N-methylpyrrolidone, 0.5 g Additol XW 395 and 20 g of water and applied to clean steel sheets. After hardening at 165° C., a very evenly spread, glossy, tough and resilient, clear coating was obtained, which was not affected by 15 minutes exposure to petrol or 48 hours exposure to water.

Example 8

660 g (13.9% by wt.) of phthalic anhydride, 1,200 g (25.2% by wt.) of pentaerythritol, 2,400 g (50.4% by wt.) of soybean fatty acid and 500 g (10.5% by wt.) of benzoic acid were weighed into a 5 l reaction vessel equipped with stirring, cooling and heating devices and a water separator, and esterified at 220° C. until the acid number was 2. The polyester then had an OH number of 176.

620 g of this polyester, 150 g of a polycarbonate polyol having a molecular weight of about 1,200 and an OH number of about 80, 10 g of neopentyl glycol, 45 g of dimethylolpropionic acid and 1.2 g of dibutyltin oxide were dissolved in 111 g of NMP at 80° C. After the addition of 140 g of isophorone diisocyanate and 40 g of perhydro-diphenylmethane diisocyanate, stirring was continued at 125° C. until NCO groups were no longer detectable. The product was then cooled to 90° C. and dispersed in a mixture of 15.7 g of triethylamine, 8 g of 30% strength ammonia and 2,250 g of water. A oxidatively drying, stable, polyester polyol dispersion 8) was obtained, with a solids content of about 30% and an organic solvent content of about 3.3%.

The polycarbonate polyol was prepared by reacting diphenyl carbonate with a mixture of 1,6-hexanediol, trimethylolpropane and Ocenol 110/130 (commercially available, unsaturated fatty alcohol from Henkel) in the ratio by weight of 67:11:22.

Properties of the dispersed polyester polyol:
Acid number (mg KOH/g): 20
OH number (mg KOH/g): 77
Percentage of urethane groups (—NHCOO—): 9
Percentage of carbonate groups (—OCOO—): 5

Polyester polyol dispersion 8) was treated with an aqueous drying dispersion based on cobalt-II octoate (0.06% metal to 100% binder), zinc-II octoate (0.2% metal to 100% binder) and zirconium octoate (0.2% metal to 100% binder), applied to glass plates in a wet-film thickness of 180 μm and dried for 24 hours at room temperature. A glossy film which was evenly spread and possessing good resistance to water and petrol was obtained.

Example 9

430 g of the polyester described in Example 1, 40 g of dimethylolpropionic acid and 400 g of the polycarbonate diol described in Example 1 were dissolved in 75 g of N-methylpyrrolidone, treated with 1 g of dibutyltin oxide and reacted with 130 g of isophorone diisocyanate at 90° to 120° C. When NCO groups were no longer detectable, 20.4 g of dimethylethanolamine were added and the polymer was dispersed in 1,030 g of water. A stable, homogeneous polyester polyol dispersion 9) was obtained which had a solids content of about 47% and an organic solvent content of about 3.5%.

Properties of the dispersed polyester polyol:
Acid number (mg KOH/g): 19
OH number (mg KOH/g): 75
Percentage of urethane groups (—NHCOO—): 7
Percentage of carbonate groups (—OCOO—): 16

213 g (0.14 mol) of polyester polyol dispersion 9) were treated with 51.0 g (0.19 mol) of a biuret group-containing polyisocyanate prepared from hexamethylene diisocyanate and having an NCO content of 22%, 5 g of butyl glycol, 4 g of butyl glycol acetate, 60 g of water and 1 g of a commercially available polyurethane thickener (Acrysol RM 8, Rohm and Haas), homogenized by stirring and left for 30 minutes for the foaming to subside. Films were then applied to wooden boards and dried at room temperature. After hardening, clear, cross-linked coatings having very good solvent resistance (no effect after 200 double rubs) and water-resistance (no effect after 24 hours exposure to water using damp cotton wool wads) were obtained.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A water dilutable, urethane group-containing polyester polyol having an acid number of 6 to 45 mg KOH/g, wherein 25 to 100% of the acid groups are neutralized by bases, a hydroxyl number of 20 to 250 mg KOH/g, a molecular weight ($M_w$) of 2,000 to 150,000 and a urethane content (—NH—CO—O—) of 2 to 16% by weight, wherein the polyester polyol comprises the at least partly neutralized reaction product of
   a) 35 to 90% by weight of one or more branched polyester polyols having a hydroxyl number of 40 to 600 and comprising the reaction product of
      a1) 0 to 60% by weight of one or more monocarboxylic acids having 6 to 22 carbon atoms,
      a2) 6 to 65% by weight of one or more di- and/or tricarboxylic acids or their anhydrides,
      a3) 10 to 70% by weight of one or more alcohols having two and/or more hydroxyl groups,
      a4) 0 to 35% by weight of one or more monoalcohols,
      a5) 0 to 30% by weight of one or more hydroxycarboxylic acids, aminocarboxylic acids, lactones, lactams and aminoalcohols and
      a6) 0 to 45% by weight of one or more polycarbonate polyols having a molecular weight of 450 to 16,000,
   b) 0.5 to 8.5% by weight of one or more hydroxycarboxylic acids
   c) 0 to 15% by weight of one or more compounds containing at least one OH, NH and/or $NH_2$ group and having a molecular weight of 32 to 500,
   d) 3 to 33% by weight of one or more compounds containing at least two isocyanate groups and having a molecular weight of 168 to 2,000 and
   e) 0 to 45% by weight of one or more polycarbonate polyols having a molecular weight of 450 to 16,000,
   wherein the percentages of a) to e) and a1) to a6) add up to 100% and wherein the urethane group-containing polyester polyols contain 1 to 25% by weight of carbonate groups (—O—CO—O—) incorporated through components e) and/or a6).

2. A water dilutable, urethane group-containing polyester polyol having an acid number of 9 to 35 mg KOH/g, wherein 45 to 100% of the acid groups are neutralized by bases, a hydroxyl number of 35 to 220 mg KOH/g, a molecular weight ($M_w$) of 3,500 to 70,000 and a urethane content (—NH—CO—O—) of 3.5 to 13.5% by weight, wherein the polyester polyol comprises the at least partly neutralized reaction product of
   a) 41 to 86% by weight of one or more branched polyester polyols having a hydroxyl number of 50 to 450 and comprising the reaction product of
      a1) 0 to 55% by weight of one or more monocarboxylic acids having 7 to 18 carbon atoms,
      a2) 11 to 58% by weight of one or more di- and/or tricarboxylic acids or their anhydrides,
      a3) 17 to 63% by weight of one or more alcohols having two and/or more hydroxyl groups,
      a4) 0 to 15% by weight of one or more monoalcohols and
      a5) 0 to 20% by weight of one or more hydroxycarboxylic acids, aminocarboxylic acids, lactones, lactams and aminoalcohols,
   b) 1.5 to 7.0% by weight of 2,2-bis(hydroxymethyl)alkanoic acid,
   c) 0 to 10% by weight of one or more compounds containing at least one OH, NH and/or $NH_2$ group and having a molecular weight of 32 to 500,
   d) 5 to 26% by weight of one or more compounds containing at least two isocyanate groups and having a molecular weight of 168 to 2,000 and
   e) 5 to 40% by weight of one or more polycarbonate polyols having a molecular weight of 450 to 16 000,
   wherein the percentages of a) to e) and a1) to a5) add up to 100% and wherein the urethane group-containing polyester polyols contain 1 to 25% by weight of carbonate groups (—O—CO—O—) incorporated through component e).

3. A water dilutable, urethane group-containing polyester polyol having an acid number of 9 to 35 mg KOH/g, wherein 45 to 100% of the acid groups are neutralized by bases, a hydroxyl number of 35 to 220 mg KOH/g, a molecular weight ($M_w$) of 3,500 to 70,000 and a urethane content (—NH—CO—O—) of 3.5 to 13.5% by weight, wherein the polyester polyol comprises the at least partly neutralized reaction product of
   a) 41 to 86% by weight of one or more branched polyester polyols having a hydroxyl number of 50 to 450 and comprising the reaction product of
      a1) 0 to 45% by weight of one or more monocarboxylic acids having 7 to 18 carbon atoms,
      a2) 11 to 55% by weight of one or more di- and/or tricarboxylic acids or their anhydrides,
      a3) 14 to 60% by weight of one or more alcohols having two and/or more hydroxyl groups,
      a4) 0 to 15% by weight of one or more monoalcohols,
      a5) 0 to 20% by weight of one or more hydroxycarboxylic acids, aminocarboxylic acids, lactones, lactams and aminoalcohols and
      a6) 5 to 45% by weight of one or more polycarbonate polyols having a molecular weight of 450 to 16,000,
   b) 1.5 to 7.0% by weight of 2,2-bis(hydroxymethyl)alkanoic acid,
   c) 0 to 10% by weight of one or more compounds containing at least one OH, NH and/or $NH_2$ group and having a molecular weight of 32 to 500 and
   d) 5 to 26% by weight of one or more compounds containing at least two isocyanate groups and having a molecular weight of 168 to 2,000,
   wherein the percentages of a) to d) and a1) to a6) add up to 100% and wherein the urethane group-containing polyester polyols contain 1 to 25% by weight of carbonate groups (—O—CO—O—) incorporated through component a6).

4. A water dilutable binder which comprises
A) 30 to 98% by weight of a water dilutable, urethane group-containing polyester polyol having an acid number of 6 to 45 mg KOH/g, wherein 25 to 100% of the acid groups are neutralized by bases, a hydroxyl number of 20 to 250 mg KOH/g, a molecular weight ($M_w$) of 2,000 to 150,000 and a urethane content (—NH—CO—O—) of 2 to 16% by weight, wherein the polyester polyol comprises the at least partly neutralized reaction product of a) 35 to 90% by weight of one or more branched polyester polyols having a hydroxyl number of 40 to 600 and comprising the reaction product of
   a1) 0 to 60% by weight of one or more monocarboxylic acids having 6 to 22 carbon atoms,
   a2) 6 to 65% by weight of one or more di- and/or tricarboxylic acids or their anhydrides,
   a3) 10 to 70% by weight of one or more alcohols having two and/or more hydroxyl groups,
   a4) 0 to 35% by weight of one or more monoalcohols,
   a5) 0 to 30% by weight of one or more hydroxycarboxylic acids, aminocarboxylic acids, lactones, lactams and aminoalcohols and
   a6) 0 to 45% by weight of one or more polycarbonate polyols having a molecular weight of 450 to 16,000,
b) 0.5 to 8.5% by weight of one or more hydroxycarboxylic acids
c) 0 to 15% by weight of one or more compounds containing at least one OH, NH and/or $NH_2$ group and having a molecular weight of 32 to 500,
d) 3 to 33% by weight of one or more compounds containing at least two isocyanate groups and having a molecular weight of 168 to 2,000 and
e) 0 to 45% by weight of one or more polycarbonate polyols having a molecular weight of 450 to 16,000, and
B) 2 to 70% by weight of one or more cross-linking agents, wherein the percentages of a) to e) and a1) to a6) add up to 100%, the urethane group-containing polyester polyols contain 1 to 25% by weight of carbonate groups (—O—CO—O—) incorporated through components e) and/or a6) and the percentages of A) and B) are based on the solids content of A) and B).

5. The water dilutable binder of claim 4 wherein component B) comprises an aminoplast resin.

6. The water dilutable binder of claim 5 wherein component B) comprises a polyisocyanate having blocked isocyanate groups.

7. The water dilutable binder of claim 5 wherein component B) comprises a polyisocyanate having free isocyanate groups.

8. A coating or jointing composition containing the water dilutable binder of claim 5 and optionally other hydroxyl group-containing resins.

* * * * *